United States Patent [19]

Harrison et al.

[11] Patent Number: 5,068,916
[45] Date of Patent: Nov. 26, 1991

[54] COORDINATION OF WIRELESS MEDIUM AMONG A PLURALITY OF BASE STATIONS

[75] Inventors: Colin G. Harrison, Brookfield, Conn.; Peter D. Hortensius, Goldens Bridge, N.Y.

[73] Assignee: International Business Machines Corporation, Armonk, N.Y.

[21] Appl. No.: 605,628

[22] Filed: Oct. 29, 1990

[51] Int. Cl.$^5$ ............................................. H04B 7/00
[52] U.S. Cl. ................................... 455/39; 370/100.1; 375/107; 359/118; 359/152; 359/154
[58] Field of Search .................. 455/49, 51, 66, 67, 455/601, 607; 370/85.1, 110.1, 100.1, 85.3; 375/107

[56] References Cited

U.S. PATENT DOCUMENTS

| | | | |
|---|---|---|---|
| 4,402,090 | 8/1983 | Gfeller et al. | |
| 4,456,793 | 6/1984 | Baker et al. | |
| 4,792,945 | 12/1988 | Mark | 370/110.1 |
| 4,797,875 | 1/1989 | Pospischil et al. | 370/110.1 |
| 4,807,222 | 2/1989 | Amitay | |
| 4,809,257 | 2/1989 | Gantenbein et al. | |
| 4,876,742 | 10/1989 | Vacon et al. | 455/66 |
| 4,890,303 | 12/1989 | Bader | 375/107 |
| 4,972,410 | 11/1990 | Cohen et al. | 455/51 |
| 5,014,344 | 5/1991 | Goldberg | 455/51 |

OTHER PUBLICATIONS

"Infrared Microbroadcasting Network for In-House Data Communication" by F. Gfeller, IBM Technical Diclosure Bulletin, vol. 24, No. 8, Jan. 1982.
"Wireless Connection Between a Controller and a Plurality of Terminals" by F. Closs et al., IBM Technical Disclosure Bulletin, vol. 20, No. 7, Dec. 1977.

*Primary Examiner*—Curtis Kuntz
*Attorney, Agent, or Firm*—Perman & Green

[57] ABSTRACT

Method and apparatus for coordinating a usage of a wireless transmission medium among a plurality of transmission units (12). The transmission medium is of a type that is utilized in accordance with a protocol having a transmission period that is comprised of a plurality of consecutively occurring transmission sub-periods. A method includes the following steps. A data structure (28a) is periodically circulated among the transmission units, the data structure being expressive of an identification of each of the transmission units and also expressive of an identification of an assigned transmission sub-period or sub-periods, if any, during which each of the transmission units is permitted to transmit on the wireless medium. The step of circulating includes the following steps: (a) receiving the data structure from a first transmission unit with a second transmission unit; (b) respsonsive to the receipt of the data structure at the second transmission unit processing the data structure in accordance with an amount, if any, of impending transmission activity to modify the assignments of sub-periods therein; and (c) transmitting the modified data structure to another one of the transmission units. A method of synchronizing the plurality of transmission units to a slotted transmission protocol is also disclosed.

20 Claims, 4 Drawing Sheets

COORDINATION OF WIRELESS MEDIUM AMONG A PLURALITY OF BASE STATIONS

FIELD OF THE INVENTION

This invention relates generally to data communication systems and, in particular, to a method for coordinating the operation of a plurality of fixed base stations that communicate with one or more mobile workstations, or mobile units.

BACKGROUND OF THE INVENTION

Portable data processing apparatus, such as workstations and other devices, may be connected to a local area network (LAN) via wireless links, which may use infrared or radio signals as a communications medium. The connection of the portable data processor to the LAN is through a base station. The base station is an intelligent device that may appear to the LAN as a bridge, a gateway or a concentrator. There may be multiple mobile units connected by wireless links to a single base station, the base station providing a protocol that enables the mobile units to communicate with the LAN. The mobile units may appear to the LAN to be a subnet or to be part of the same logical LAN. Whatever protocol is employed, a mapping exists for ensuring that network data messages, or datagrams, that are addressed to a mobile unit are routed to the appropriate base station for transmission to the addressed mobile unit. The mapping also ensures that datagrams originating with a particular one of the mobile units are correctly routed into the LAN.

If multiple infrared base stations are employed to provide coverage of a large space, such as a corridor, an auditorium, or an open-plan office, overlapping coverage is desirable to avoid 'dead spots' where no communication is possible. However, it then becomes likely that there will exist overlapping regions wherein a given mobile unit is within range of two or more base stations. In radio cellular telephone systems this problem is resolved by coordinated frequency re-use. However, for an infrared transmission medium the use of alternate frequencies or wavelengths is severely restricted by the unavailability of low cost, tunable infrared sources.

In U.S. Pat. No. 4,456,793, issued June 26, 1984, W. E. Baker et al. describe a cordless telephone system having infrared wireless links between handsets and transponders. The transponders are wired to subsystem controllers which are in turn wired to a system controller. The central controller polls the cordless stations every 100 milliseconds to detect cordless station locations and to identify "missing" cordless stations.

In U.S. Pat. No. 4,807,222, issued Feb. 21, 1989. N. Amitay describes a LAN wherein users communicate with RF or IR signals with an assigned Regional Bus Interface Unit (RBIU). Protocols such as CSMA/CD and slotted ALOHA are employed in communicating with the RBIUs.

In commonly assigned U.S. Pat. No. 4,809,257, issued Feb. 28, 1989. D. Gantenbein, F. Gfeller and E. Mumprecht describe an infrared communication system are assigned to one of a plurality of hierarchical categories.

In commonly assigned U.S. Pat. No. 4,402,090, issued Aug. 30, 1983, F. Gfeller et al. describe an infrared communication system that operates between a plurality of satellite stations and a plurality of terminal stations. A host computer communicates with the terminal stations via a cluster controller and the satellite stations, which may be ceiling mounted. Communication with the terminal stations is not interrupted even during movement of the terminal stations.

In IBM Technical Disclosure Bulletin, Vol. 20, No. 7, December 1977. F. Closs et al. describe the use of both line-of-sight and diffuse transmission of infrared signals for wireless communications between a ceiling-based controller and a plurality of terminals.

In IBM Technical Disclosure Bulletin, Vol. 24, No. 8, page 4043, January 1982. F. Gfeller describes general control principles of an infrared wireless network incorporating multiple ceiling mounted transponders that couple a host/controller to multiple terminal stations. Access to the uplink channel is controlled by a Carrier Sense Multiple Access/Collision Detection (CSMA/CD) method.

It is thus an object of the invention to provide method and apparatus to coordinate the usage of a wireless transmission medium amongst a plurality of base stations having overlapping coverage areas.

It is a further object of the invention to provide method and apparatus for synchronizing the base stations to a slotted transmission protocol.

SUMMARY OF THE INVENTION

The foregoing and other problems are overcome and the objects of the invention are realized by method and apparatus for coordinating a usage of a wireless transmission medium amongst a plurality of base stations, or transmission units. The transmission medium is of a type that is utilized in accordance with a protocol having a transmission period that is comprised of a plurality of consecutively occurring transmission sub-periods. In accordance with a method of the invention, and apparatus for practicing the method, the following steps are executed.

A data structure is periodically circulated amongst the transmission units, the data structure being expressive of an identification of each of the transmission units and also expressive of an identification of an assigned transmission sub-period or sub-periods, if any, during which each of the transmission units is permitted to transmit on the wireless medium. The step of periodically circulating includes the following steps: (a) receiving the data structure from a first transmission unit with a second transmission unit; (b) responsive to the receipt of the data structure at the second transmission unit processing the data structure in accordance with an amount, if any, of impending transmission activity to modify the assignments of sub-periods therein; and (c) transmitting the modified data structure to another one of the transmission units.

The step of processing further includes the steps of (d) modifying the data structure so as to relinquish one or more assigned transmission sub-periods or to assign to the second transmission unit one or more unassigned transmission sub-periods.

The step of processing further includes a step of, responsive to a condition wherein there are no unassigned transmission sub-periods, (e) modifying the data structure to indicate that the second transmission unit requires at least one transmission sub-period.

In accordance with a further method of the invention there is taught the synchronizing of a usage of a wireless transmission medium amongst a plurality of transmission units, each having a transmission coverage area associated therewith. At least two of the coverage areas have an overlap region therebetween. The transmission medium is utilized in accordance with a transmission period that is comprised of a plurality of consecutively occurring transmission sub-periods. The method includes the steps of: (a) transmitting a message over the wireless transmission medium with only one of the transmission units, the message being repetitively transmitted during each of the transmission sub-periods of at least one of the transmission periods; (b) receiving the repetitively transmitted messages with one or more transmitter/receiver units that are disposed within the coverage area associated with the transmitting transmission unit; and (c) re-transmitting the received messages with each of the transmitter/receiver units, including a transmitter/receiver unit, if any, that is disposed within the overlap region. The method further includes the steps of: (d) receiving the re-transmitted messages with another transmission unit, the re-transmitted message being transmitted from the transmitter/receiver unit located within the overlap region; and, responsive to the reception of the re-transmitted messages, (e) synchronizing a timekeeping function of the second transmission unit thereto so as to subsequently determine with the timekeeping function a required starting time of a predetermined one of the sub-periods for transmitting or receiving another message.

BRIEF DESCRIPTION OF THE DRAWING

The above set forth and other features of the invention are made more apparent in the ensuing Detailed Description of the Invention when read in conjunction with the attached Drawing, wherein:

FIG. 1b is a block diagram of the base station of FIG. 1a;

FIG. 1c is a block diagram of the mobile unit of FIG. 1a;

DETAILED DESCRIPTION OF THE INVENTION

Figure 1A:
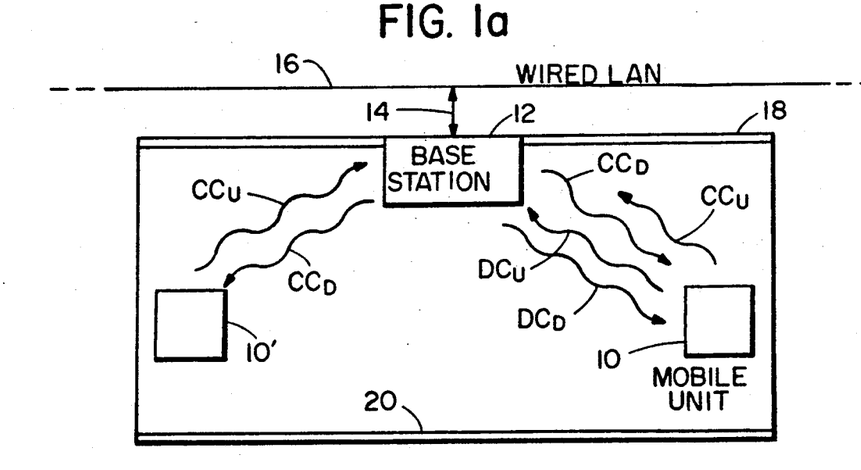
FIG. 1a is a block diagram showing a plurality of mobile units communicating with a base station.

FIG. 1a depicts an embodiment of the invention wherein a mobile data station, also referred to herein as a transmitter/receiver unit or as a mobile data processing unit 10, is in bidirectional communication over an optical radiation communications channel with a network adapter, also referred to herein as a transmission unit or a base station 12. The base station 12 is coupled via a connector 14 to a wired local area network (LAN) 16. As shown the base station 12 is disposed within or adjacent to a ceiling 18 and the mobile unit 10 is carried or is otherwise transported over a floor 20. Of course, the mobile unit 10 may be used in a stationary manner if desired.

In accordance with a presently preferred communication technique, communication between the mobile unit 10 and the base station 12 is accomplished through two discrete optical channels. Specifically, there is provided a relatively low-bandwidth, for example 50 k Bits/s, diffuse transmission command channel (CC) and a relatively higher-bandwidth, for example 1 M Bit/s or higher, data channel (DC). An uplink command channel ($CC_U$), uplink being from the mobile unit 10 to the base station 12, has a carrier frequency or wavelength that is offset from a downlink command channel ($CC_D$), downlink being from the base station 12 to the mobile unit 10, by an amount sufficient to prevent collisions between uplink and downlink command messages. Similarly, an uplink data channel ($DC_U$) has a carrier frequency or wavelength that is offset from a downlink data channel ($DC_D$) by an amount sufficient to prevent collisions between uplink and downlink data messages.

The communications channels are carried via an infrared (IR) data link having a preferred wavelength of approximately 1.4 microns, although presently available optical devices readily provide for operation within the range of approximately 750 nanometers to approximately 1000 nanometers. In accordance with the presently preferred embodiment the command channel is carried by the diffuse transmission, relatively low bit-rate channel, while the data channel is conveyed by a line-of-sight, relatively high bit-rate channel. This permits the control channel of a mobile unit 10, including one that is just coming within range of a base station 12, to establish communication with the base station 12, and also possibly through the LAN 16 to a host system, before reliable communication becomes feasible on the higher frequency data channel. The result is the provision of a more reliable and more efficient infrared data communications network.

This presently preferred communication technique is disclosed in commonly assigned U.S. Pat. Application Ser. No. 07/605,586, filed 10/29/90, entitled "Control Method and Apparatus for a Wireless Data Link", by C. Harrison et al. It should be realized however that the present teaching is not to be construed to being limited to only a wireless system as disclosed in this commonly assigned U.S. Patent Application.

Figure 1B:
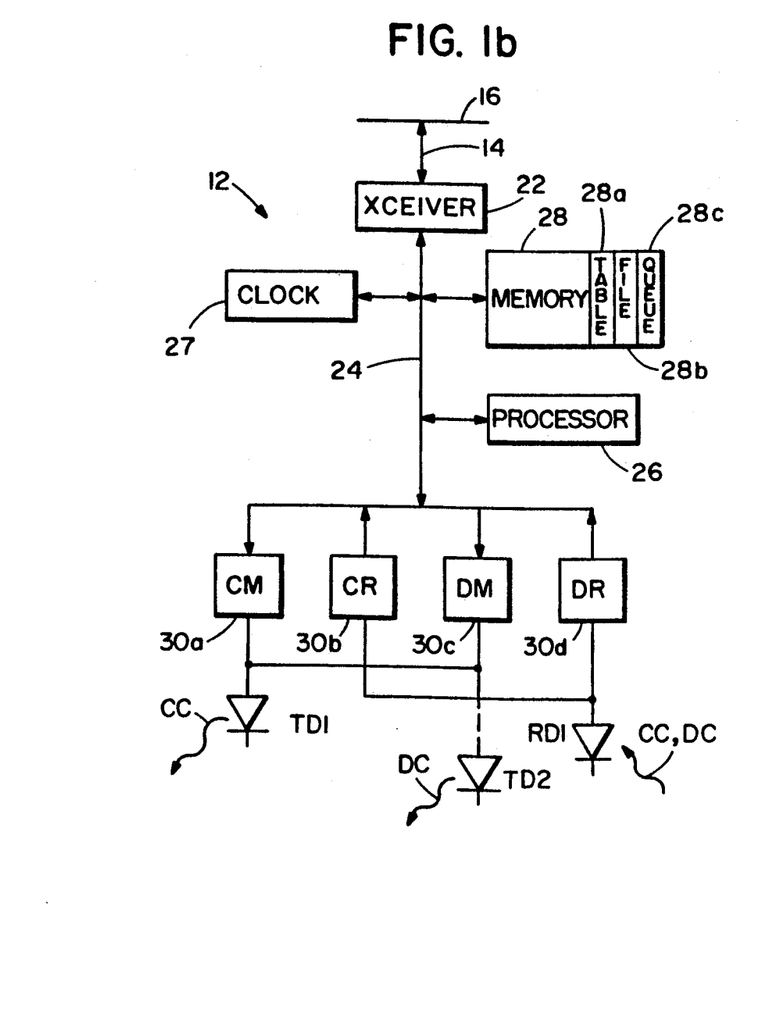

Referring to FIG. 1b there is shown a simplified block diagram of the base station 12. The base station 12 is coupled to the LAN 16 via the connector 14. Connector 14 is coupled to a network adapter transceiver 22 which in turn is coupled to an internal bus 24. The base station 12 includes a processor 26 that is bidirectionally coupled to a memory 28 that stores program-related and other data, including packets of data transmitted to or received from the mobile units 10. Also bidirectionally coupled to the processor 26 is a time keeping unit, or clock 27, the use of which is described below. Processor 26 also communicates with a plurality of modulators and receivers, specifically a control modulator 30a, a control receiver 30b, a data modulator 30c and a data receiver 30d. These IR modulators and receivers have inputs coupled to suitable infrared emitting or receiving devices such as laser diodes, LEDs and photodetectors. In the illustrated embodiment the control modulator 30a and the data modulator 30c both have an output coupled to a transmit diode 1 (TD1). In an alternate embodiment the data modulator 30c is not coupled to the TD1 but is instead coupled to a second transmit diode (TD2).

Figure 1C:
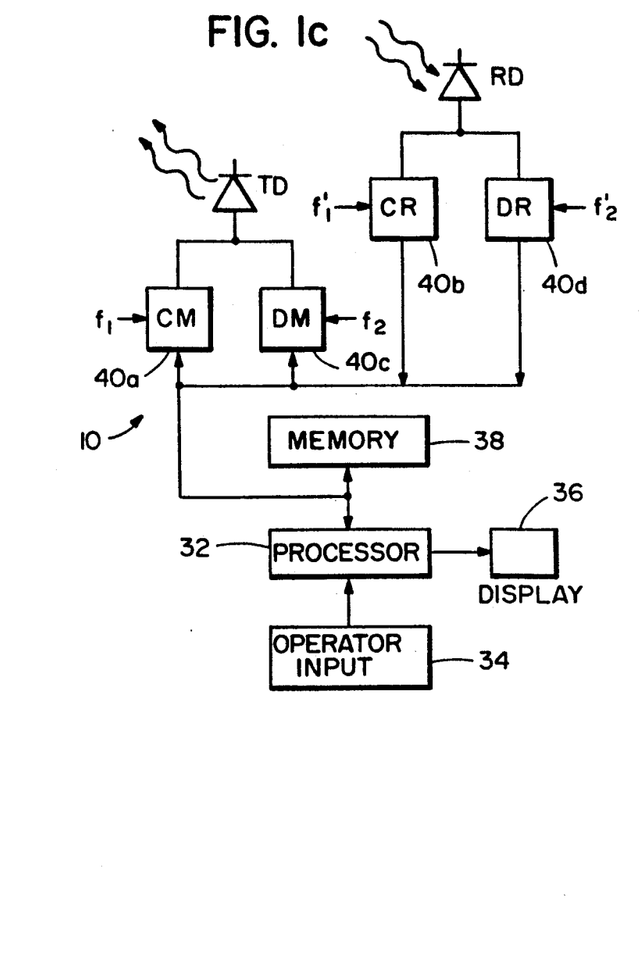

Referring now to FIG. 1c there is shown in block diagram form an embodiment of the mobile unit 10. Mobile unit 10 includes a processor 32 coupled to an operator input device 34 and also coupled to an operator display device 36. Operator input device 34 may be a keyboard or any suitable data entry means. Similarly, operator display device 36 may be a flat panel alphanumeric display or any suitable display means. Also coupled to processor 32 is a memory 38 that stores program-related data and other data, such as packets of information received from or intended to be transmitted to the base station 12 and also an identification of the mobile unit 10. Also coupled to processor 32 are a plurality of command and data modulators and receivers 40a-40d. IN FIG. 1c it can be seen that the command modulator 40a (uplink) is provided with a first frequency $f_1$ while the command receiver 40b (downlink) is provided with a second frequency $f_1$, that is offset from $f_1$. Similarly, it can be seen that the data modulator 40c (uplink) is provided with a first frequency $f_2$ while the data receiver 40d (downlink) is provided with a second frequency $f_2$, that is offset from $f_2$. The data receivers or FIG. 1b and 1c include demodulators and filters and operate in a conventional manner to extract the modulated bit stream from the received optical signals. Similarly, the modulators of FIGS. 1b and 1c operate in a conventional manner to modulate the optical output in accordance with a transmitted bit stream.

The wired LAN 16 may conform to any suitable network configuration. One suitable network protocol is known as TCP/IP, as described in detail in "Internetworking with TCP/IP Principles, Protocols, and Architectures" by Douglas E. Comer, Prentice Hall, N.J., 1988.

Figure 2:
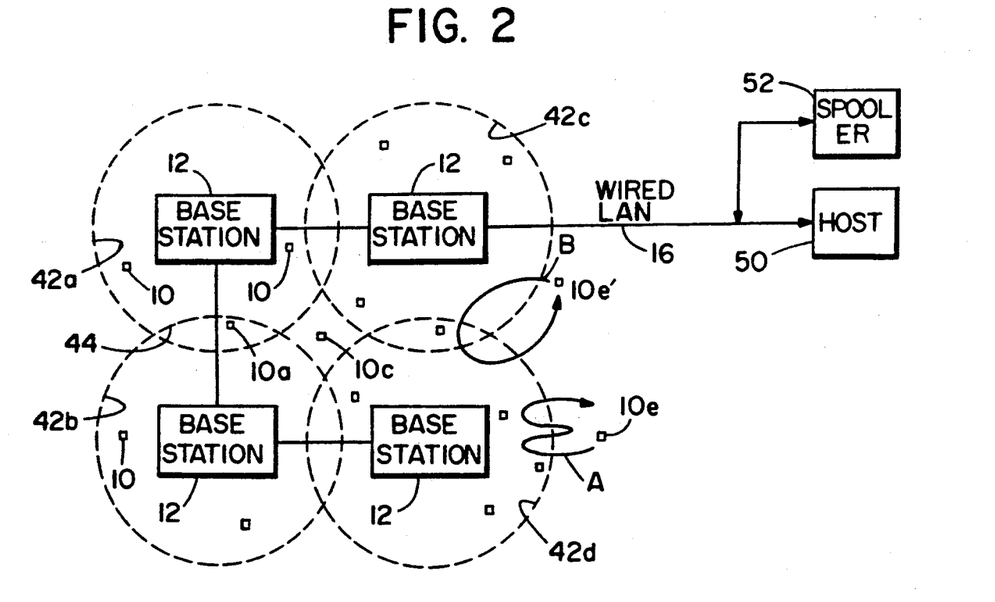
FIG. 2 shows a plurality of overlapping base station communication cells.

FIG. 2 illustrates a plurality of the base stations 12 each of which is coupled to a wired LAN 16 which in turn is coupled to a host data processing system 50. A mass data storage device, or spooler 52, may also be coupled to the LAN 16. The base stations 12 are disposed such that a substantially symmetrical optical field (42a-42d) associated with each are overlapping. It can be seen that certain of the plurality of mobile units 10 are contained wholly within a single one of the fields, or cells, 42 while the mobile unit 10a is disposed within an overlapping region 44 between the cells 42a and 42b. The mobile unit 10c is disposed within a region not covered by any of the base stations 12. During use, the mobile units 10 can be expected to move about within a given region and to travel, or migrate, from one cell 42 to another. This is depicted by the mobile units 10e and 10e'. Mobile unit 10e can be seen to enter the cell 42d along the path A and to subsequently exit, reenter and again exit the cell 42d. The mobile unit 10e' can be seen to follow the path B and to enter the cell 42c, pass through an overlap region, pass into the cell 42d and subsequently exit the coverage region altogether.

A method that provides a handoff mechanism that permits the mobile units 10e and 10e' to establish contact with various ones of the base stations 12 while preserving an appearance of a constant connection to the LAN 16 is disclosed in a commonly assigned U.S. Patent Application Ser. No. 07/605,728, filed 10/29/90, entitled "Handoff Method and Apparatus for Mobile Wireless Workstations" by C. Harrison et al.

Figure 3:
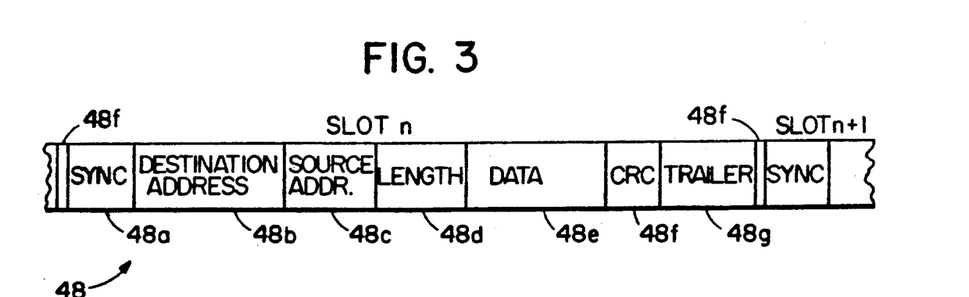
FIG. 3 shows one embodiment of a TDMA slot that is suitable for communicating command and data information between the mobile units and a base station.

Communication is preferably achieved by Time Division Multiple Access (TDMA) technique wherein a plurality of slots make up a frame. The frames are repeatedly transmitted and a given mobile unit 10 is assigned one or more specific slots within which to transmit or receive information. FIG. 3 illustrates one suitable slot 48 format that is similar to that disclosed in the before mentioned commonly assigned U.S. Pat. No. 4,402,090. Specifically, a slot delimiter or synchronization (SYNC) field 48a is followed by a destination address field 48b and a source address field 48c. For an uplink message the destination address would be that of a base station 12 while the source address would be that of the transmitting mobile unit 10. In this regard each of the mobile units is assigned an identifier or address that typically corresponds to a network address. The mobile unit 10 addresses may be hardwired or otherwise preassigned. Preferably, the addresses are dynamically assigned when communication is established between the network and the mobile unit 10.

A next slot 48 field is a length field 48d which gives the length in bytes of the following data field 48e. For a command slot the data field will typically be substantially smaller than a data field 48e associated with a data slot. Following the data field 48e is a data integrity field, typically a CRC field 48f. A further slot delimiter is provided by a trailer field 48g. It should be realized that this format is exemplary only and that a number of suitable formats can be devised.

In the optical communication system of the invention all wireless communication is between the base station 12 and the mobile units 10. There is no direct communication between the mobile units 10. The slotted TDMA method is employed for transmission in each direction. Frames of slots 48 are passed to or from mobile units 10 which are allocated specific slots according to an arbitration scheme performed by the base station 12.

Typical control events that are conveyed between the mobile unit 10 to the base unit 12 upon the lower bandwidth $CC_U$ channel may include, but are not limited to, the following.

a) Establishment of connection with the base station 12; that is, becoming a member of the base station's mobile unit group.

b) Authentication of the mobile unit's identity.

c) Request for access to the medium, when the mobile unit 10 has one or more slots to transmit. This involves an arbitration performed by the base station 12 among those members of the associated mobile unit group having slots to transmit. These mobile units may also be referred to as "active members".

d) Deletion of access to the medium at the end of a transmission or if the mobile unit 10 "disappears" or disconnects.

e) Control of optical power or of data transmission rates to accommodate a close approach to the base station 12 by the mobile unit 10 or to permit lowered transmission rates when the signal path is shadowed. By example, it may be desirable to reduce transmitted power within a certain radius of the base station 12 in order to prevent overdriving the CR 30.

f) Allocation of a slot 48 for the uplink data transmission.

g) Re-transmission of uplink slots found to have transmission errors.

h) A request to the mobile unit 10 to temporarily suspend transmission.

i) A request to the mobile unit 10 to discard any data that remains to be transmitted.

Of these various and exemplary control events the first (a) of establishing connection with the base station 12 is the most complex in that it requires the mobile unit 10 and the base station 12 to detect and acknowledge each other's presence.

In operation a mobile unit 10 seeking a base station 12 transmits a request for connection on the control channel by using maximum optical power. Since, in a presently preferred embodiment of the invention, the control channel is separate from the data channel this asynchronous transmission does not interfere with uplink data transmission that may be process between the base station 12 and another mobile unit 10, although it may interfere with ongoing uplink control signals.

The access mechanism for the uplink control channel is preferably a simple ALOHA protocol of a type known in the art. This protocol permits asynchronous requests for connection by an approaching mobile unit 10 to be handled in the same manner as requests from the existing group members. To improve the "fairness" of the ALOHA access under near/far conditions, the mobile units 10 preferably have controllably variable power levels for the control signal transmission.

After the new mobile unit 10 is added to the base station 12 group the newly added member of the group is enabled to exchange control messages with the base station 12 using the uplink and downlink control channels.

In regard to downlink control events it is noted that there is no requirement for downlink media access control, since only the base station 12 uses the downlink channel whereas the uplink channel must be shared b all of the mobile units within the associated group. It is assumed that the base station 12 avoids transmitting slots to mobile units that are not members of its group. That is, the base station 12 transmits only to those mobile units 10 with which the base station 12 has an established link. For the downlink path therefore, the mobile unit 10 need only recognize slots 48 having the mobile unit's address within the field 48b.

Downlink control events that are conveyed from the base station 12 to the mobile unit 10 upon the $CC_D$ channel may include, but are not limited to, the following.

a) Notification of an intention to transmit to a specific mobile unit 10 (n) slots of information.

b) Notification of the end of the transmission.

Uplink responses to these control events from the mobile unit 10 to the base station 12 include the following.

a) Acknowledgement of the receipt of a slot.

b) A request for re-transmission of a slot.

c) A request for a temporary suspension of data transmission due to, for example, a buffer full condition. p d) A request for a more rapid transmission of slots. A base station 12 response to this uplink control event may be to allocate more time slots 48 within a frame to the requesting mobile unit 10.

e) A request for a less rapid transmission of slots. A base station 12 response to this uplink control event may be to allocate fewer time slots 48 within a frame to the requesting mobile unit 10.

The downlink control channel is broadcast to all mobile units within the group and the control slot 48 address field 48b enables only the addressed mobile unit(s) to identify their control messages. The downlink data channel is also broadcast to all mobile units within the group and the corresponding data slot 48 address field 48b enables only the addressed mobile unit(s) to identify their respective data packets.

The newly added mobile unit 10 synchronizes with the data link slot sequence by being assigned one slot number by the base unit 10, via the control channel. Thereafter the mobile unit 10 is expected to internally keep track of slot numbers, although it can request to be assigned a slot any number of times. The uplink and downlink paths employ the same set of slot numbers. A mobile unit 10 which has been authorized to use the uplink path waits for the beginning of its' authorized slot before sending data. A mobile unit 10 which has been instructed via the control channel to expect one or more packets of data from the downlink channel waits for the specified slot to occur and then begins to capture the information conveyed by that slot. A mobile unit can thus receive and transmit using a single assigned control or data slot.

What follows now is a detailed description of a presently preferred method for achieving coordination between the base stations 12. This coordination results in an efficient use of the infrared medium for the implementation shown in FIG. 3, where the base stations 12 have overlapping coverage areas and wherein a particular one or ones of the mobile units 10 may be within an overlapping region between the communication cells 42.

In accordance with this method of the invention a TDMA protocol is employed among the base stations for the use of the optical medium for both the uplink and downlink directions. The use of this protocol implies that communication between the base stations 12 and the mobile units 10 is organized as frames, each frame being comprised of a plurality of the slots 48. The number of slots 48 is preferably equal at least to the number of base stations 12 in a given coverage area. Typically the number of slots 48 will be within a range of from four to 64 slots per frame. For a coordinated group of N base stations each base station 12 is allocated one or more of the slots 48 for communicating with the associated group of mobile units 10 within the base station coverage area. This technique effectively decreases the useful bandwidth of the infrared link by up to a factor N. If the wireless link bandwidth is greater than or equal to the bandwidth of the wired network connecting the coordinated group of base stations 12, and if most of the communications traffic is from a mobile unit 10 to a network server, or to a mobile unit 10 associated with another base station 12, this sharing does not reduce the overall capacity of the system, in that the capacity is limited by the wired network.

Figure 4:
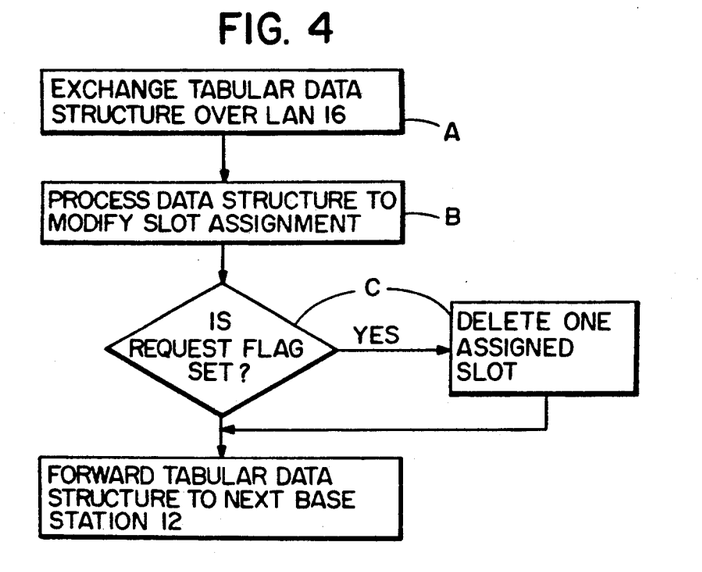
FIG. 4 depicts a logic flow interaction between base stations and a mobile unit that accomplishes, in accordance with the invention, a coordination transmission medium access for multiple base stations.

In accordance with this method, and referring to FIG. 4, the following steps are executed.

Step A

Figure 6:
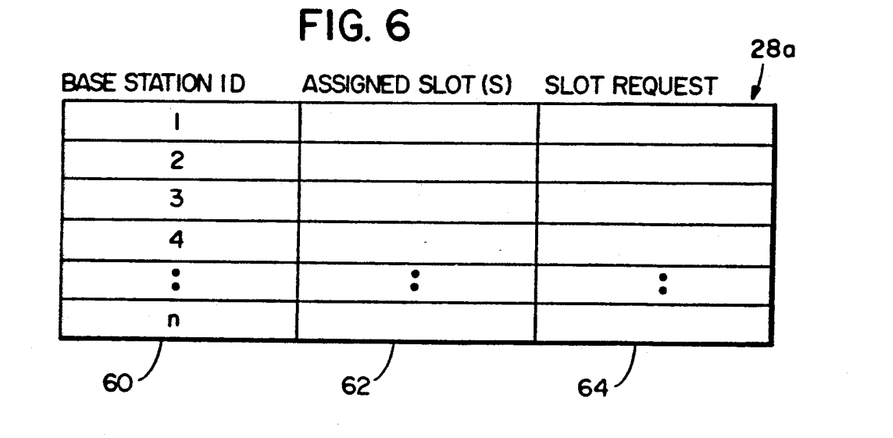
FIG. 6 depicts a data structure having a tabular format, the data structure being exchanged between the base stations for assigning access to sub-periods, or slots, of a TDMA frame period.

The base stations 12 periodically transfer or circulate among themselves a data structure, such as a table 28a depicted in FIGS. 1c and 6, in which an identification field 60 contains an identification of each of the base stations 12. A second field 62 contains entries of assigned TDMA slot numbers for both the uplink and the downlink directions. The exchange of the table 28a occurs over the wired LAN 16 that connects the base stations 12. Preferably the table 28a circulates among the base stations 12 approximately once a second. When received from the LAN 16, using whatever LAN protocol is in effect, the table 28a is stored in memory 28 and is processed by the receiving base station 12. The modified table is then transmitted over the LAN 16 to a next base station 12 which then processes the table 28a and forwards it to a next base station 12, etc.

It is desirable that each base station 12 have access to a table initialization file 28b stored within, preferably, the memory 28. Initialization file 28b is accessed by the base stations 12 in the event of a malfunction, an overall system initialization, or at any time that it is desired to re-initialize the normally circulating table 28a to a known state. The initialization table may also be maintained by the host 50 and downloaded over the LAN 16 to all of the base stations 12.

Step B

Processing of the table 28a proceeds as follows. When a given one of the base stations receives the circulating table from LAN 16 the base station 12 determines if it has any queued communication traffic, that is, any pending downlink data to transmit to a mobile unit 10 or any pending acknowledgements of a request by one of the mobile units 10 to send uplink data. If the base station 12 determines that it has no such pending communications traffic it deletes or removes from the field 62 of the circulating table any TDMA slots that may be assigned to it. The base station 12 then forwards the modified table to another base station.

If the base station 12 does have pending communication traffic, and if it presently has no assigned slot or slots in field 62, the base station 12 determines from the fields 62 which slot numbers are currently unassigned to any base station The base station 12 then modifies the table to assign itself a presently unassigned slot number or slot numbers. The base station 12 then forwards the modified table to another base station.

If the base station 12 does have pending communication traffic, and if the base station is already assigned one or more slots, and if an internal queue 28c (FIG. 1c) of pending communication traffic exceeds a predetermined length, then the base station assigns itself an additional slot or slots within the field 52 in order to accommodate the queued traffic. The base station 12 then forwards the modified table to another base station.

If the base station 12 does have pending communication traffic, and if the base station 12 requires a slot or additional slots and none is available, the base station 12 modifies the table by setting a flag in a request field 64 to indicate that it requires a slot. The base station 12 then forwards the modified table to another base station.

Step C

If one of the base stations 12 receives the table having a request flag set in field 64, and if the receiving base station 12 is presently assigned more than one slot and also has queued communication traffic, the receiving base station releases one of its assigned slots by deleting an assigned slot number from its' associated field 62. The base station 12 then forwards the modified table to another base station.

If the receiving base station has no pending communication traffic it deletes all of its' assigned slots, as described in Step A above, thereby freeing a slot or slots for use by a base station requiring same.

The method described above provides an efficient mechanism by which the base stations 12 reach agreement among themselves as to slot assignments and usage. It should be noted that uplink and downlink slots can be allocated separately. For this case the field 62 is differentiated into two fields, one for assigning uplink slots and one for assigning downlink slots, as is also the slot request field 64. The base stations 12 then process the received table in accordance with queued downlink traffic and also queued uplink traffic. Thus, a particular base station 12 may relinquish all of its uplink slots if it does not have any pending uplink traffic but may also, in the same table processing session, assign to itself or make a request for an additional downlink slot.

A further problem addressed and solved by the invention is the temporal synchronization of the base stations' clocks 27 so that each of the base stations 12 can be synchronized to the slotted TDMA frame structure and can identify the beginning of a respective assigned slot or slots. Synchronization is a classic problem in distributed computing, for which various solutions exists. It is noted, however, that the synchronization requirement is particularly difficult for the wireless communications application described herein.

By example, assuming that the link bandwidth is 10 Mbit/s, and if the frame length is at most 2000 bytes including framing data, then a lot duration is approximately 2.0 milliseconds. The accuracy of synchronization determines the duration of a "dead time" (depicted as 48f in FIG. 4) that must be inserted between the slots 48 to avoid collisions. Assuming that the dead time 48f is constrained to be less than 10% of the slot 48 duration then each base station 12 clock 27 must be synchronized to within 200 microseconds of all other base station clocks. This degree of synchronization is difficult to obtain over a wireless LAN, because of the unpredictable latency of transmission.

Figure 5:
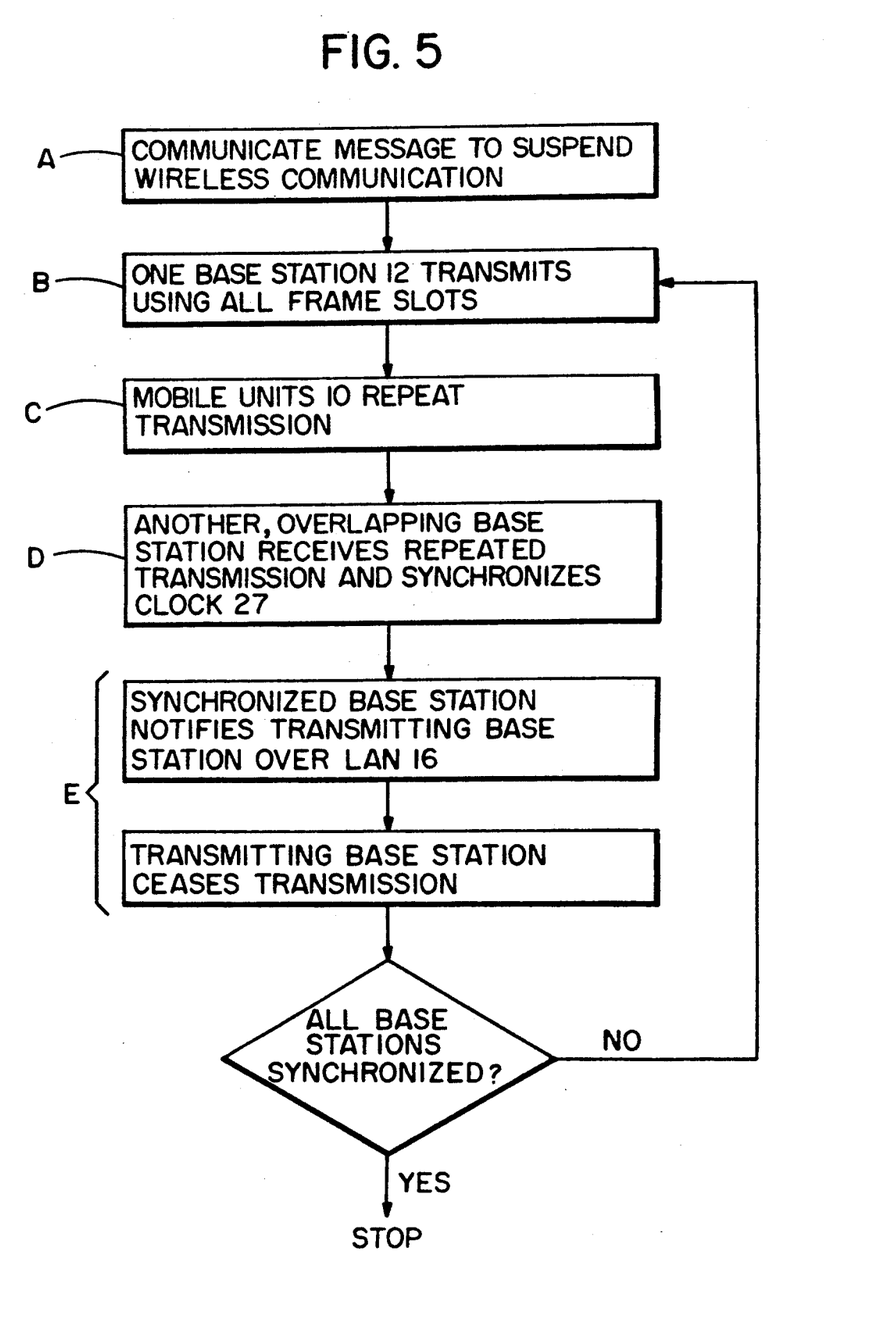
FIG. 5 illustrates a logic flow diagram of a method to achieve temporal synchronization between coordinated base stations.

A method to achieve accurate clock synchronization between the base stations 12 is depicted in the flow chart of FIG. 5 and is described in detail below.

Step A

The base stations 12, coordinated as to their access to the wireless medium as described above, periodically communicate via the wired LAN 16 a message to suspend wireless transmissions.

Step B

One of the base stations 12 begins broadcasting over the low speed diffuse control channel (CC) a predetermined message. The message is repeated during every time slot 48 within the frame.

Step C

All mobile units 10 within the coverage area of the broadcasting base station 12 receive the diffuse transmission and repeat the transmission by re-broadcasting same on their respective uplink control channels using, for example, a CDMA-CD multiple access protocol.

Step D

Any base station 12 that receives a re-broadcast transmission from a mobile unit 10 must be in a cell that overlaps the cell of the first base station 12 and in which the overlap region is occupied by at least one mobile unit. For example, in FIG. 2 if the base station 12 within cell 42a were to first broadcast the message the message would be received by the mobile units 10 within the cell and also by the mobile unit 10a within the region that overlaps cells 42a and 42b. Mobile unit 10a re-broadcasts the message, which is then received by the base station 12 associated with cell 42b. The receiving base station or base stations employ the rebroadcast transmission to synchronize their respective clocks 27 to the slot timing of the re-broadcast transmission. This synchronization is accurate to within a fraction of one bit. For a diffuse control channel bandwidth of 50 kbit/s synchronization to within 10 microseconds is achieved.

Step E

After a neighboring base station or base stations 12 synchronize their clocks 27 they so inform the first base station via the wired LAN 16. The first base station then suspends the broadcast of the predetermined synchronization message and the transmission of the synchronization message is then begun by another base station. Steps B–E are repeated until all base stations 12 have synchronized their internal clocks 27.

If there is no mobile unit 10 so positioned as to receive the initial broadcast and re-broadcast it to another base station 10, the first base station 12 eventually stops transmission after a predetermined time-out period. For this case, although the cells 42 may overlap, a synchronization problem does not currently exist in that no mobile unit 10 is presently positioned so as to be detrimentally affected by a collision between two adjacent base station 12 transmissions.

While the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. A method of coordinating a usage of a wireless transmission medium amongst a plurality of transmission means, the transmission medium being utilized in accordance with a transmission period that is comprised of a plurality of consecutively occurring transmission sub-periods, comprising the steps of:
    periodically circulating amongst the transmission means a data structure, the data structure being expressive of an identification of each of the transmission means and also being expressive of an identification of an assigned transmission sub-period or sub-periods, if any, during which each of the transmission means is permitted to transmit on the wireless medium, the step of periodically circulating including the steps of:
    receiving the data structure from a first transmission means with a second transmission means;
    responsive to the receipt of the data structure at the second transmission means processing the data structure in accordance with an amount, if any, of impending transmission activity to modify the assignments of sub-periods therein; and
    transmitting the modified data structure to another one of the transmission means.

2. A method as set forth in claim 1 wherein the step of processing includes the steps of modifying the data structure so as to (a) relinquish one or more assigned transmission sub-periods or, to (b) assign to the second transmission means one or more unassigned transmission sub-periods.

3. A method as set forth in claim 1 wherein the step of processing includes a step of, responsive to a condition wherein there are no unassigned transmission sub-periods, modifying the data structure to indicate that the second transmission means requires at least one transmission sub-period.

4. A method as set forth in claim 3 wherein the step of processing includes a step of determining from the data structure if another one of the transmission means requires a transmission sub-period; and if another transmission means is determined to require a transmission sub-period, relinquishing at least one sub-period.

5. A method as set forth in claim 1 wherein the steps of receiving and transmitting each include a step of communicating through a wired network.

6. A method as set forth in claim 1 wherein the step of processing includes a step of storing the modified data structure within the second transmission means for subsequent use and, in response to an external event, the method includes a step of initializing the stored data structure to a default condition.

7. For use in a wireless communications system, apparatus for coordinating a usage of a wireless transmission medium amongst a plurality of transmission means, the transmission medium being utilized in accordance with a transmission period that is comprised of a plurality of consecutively occurring transmission sub-periods, each of the transmission means comprising:
    means for periodically circulating amongst the transmission means a data structure, the data structure being expressive of an identification of each of the transmission means and also being expressive of an identification of an assigned transmission sub-period or periods, if any, during which each of the transmission means is permitted to transmit on the wireless medium, the circulating means comprising:
    means coupled to a wired network for receiving the data structure from another transmission means;
    means, responsive to the receipt of the data structure, for processing the data structure in accordance with an amount, if any, of impending transmission activity to modify the data structure so as to alter the assignments of sub-periods; and
    means, coupled to the wired network, for transmitting the modified data structure to another one of the transmission means.

8. Apparatus as set forth in claim 7 wherein each of the transmission means further comprises means for storing the modified data structure for subsequent use.

9. Apparatus as set forth in claim 8 wherein each of the transmission means further includes means for initializing the stored data structure to a default condition.

10. Apparatus as set forth in claim 7 wherein the wireless medium employs infrared energy and wherein each of the transmission means includes means for transmitting and receiving modulated infrared energy that is expressive of data and control information.

11. Apparatus as set forth in claim 10 wherein each of the transmission means includes means for transmitting the data with a first infrared channel at a first bandwidth; means for transmitting the control information with a second infrared channel at a second bandwidth; and wherein the first bandwidth is significantly higher than the second bandwidth.

12. Apparatus as set forth in claim 11 wherein the first channel is a line of sight channel and wherein the second channel is a diffuse transmission channel.

13. A method of synchronizing a usage of a wireless transmission medium amongst a plurality of transmission means having a transmission coverage area associated therewith, at least two of the coverage areas having an overlap region therebetween, the transmission medium being utilized in accordance with a transmission period that is comprised of a plurality of consecutively occurring transmission sub-periods, comprising the steps of:

(a) transmitting a message over the wireless transmission medium with only one of the transmission means, the message being repetitively transmitted during each of the transmission sub-periods of at least one of the transmission periods;

(b) receiving the repetitively transmitted messages with one or more transmitter/receiver means disposed within the coverage area associated with the transmitting transmission means;

(c) re-transmitting the received messages with each of the transmitter/receiver means receiving the repetitively transmitted messages, including a transmitter/receiver means, if any, that is disposed within the overlap region;

(d) receiving the re-transmitted messages from the transmitter/receiver within the overlap region with another transmission means; and responsive to the reception of the re-transmitted messages (e) synchronizing a timekeeping function of the second transmission means thereto so as to subsequently determine with the timekeeping function a required starting time of a predetermined one of the sub-periods for transmitting or receiving another message therein.

14. A method as set forth in claim 13 wherein the step of transmitting includes an initial step of each of the transmission means communicating over a wired network information that indicates that each of the transmission means is to temporarily suspend use of the wireless medium so that the first transmission means can repetitively transmit the message.

15. A method as set forth in claim 13 wherein the step of synchronizing includes an additional step of communicating over a wired network information that indicates that the second transmission means has synchronized its timekeeping function; and wherein the step of transmitting includes a step of terminating repetitive transmission of the message in response to the second transmission means having synchronized its timekeeping function.

16. A method as set forth in claim 15 wherein, if there is no transmitter/receiver means within the overlap region, the step of terminating is executed instead in response to a timeout function.

17. A method as set forth in claim 13 wherein steps (a, b, c, d and e) are executed in turn by a plurality of the transmission means until each transmission means having a coverage area that overlaps the coverage area of another transmission means has synchronized an associated timekeeping function.

18. A method as set forth in claim 13 wherein the wireless medium employs infrared energy and wherein each of the transmission means includes means for transmitting and receiving modulated infrared energy that is expressive of data and control information.

19. A method as set forth in claim 18 wherein each of the transmission means transmits the data with a first infrared channel at a first bandwidth; transmits the control information with a second infrared channel at a second bandwidth; wherein the first bandwidth is significantly higher than the second bandwidth; and wherein the repetitively transmitted messages are transmitted with the second infrared channel.

20. A method as set forth in claim 19 wherein the first channel is a line of sight channel and wherein the second channel is a diffuse transmission channel.

* * * * *